UNITED STATES PATENT OFFICE.

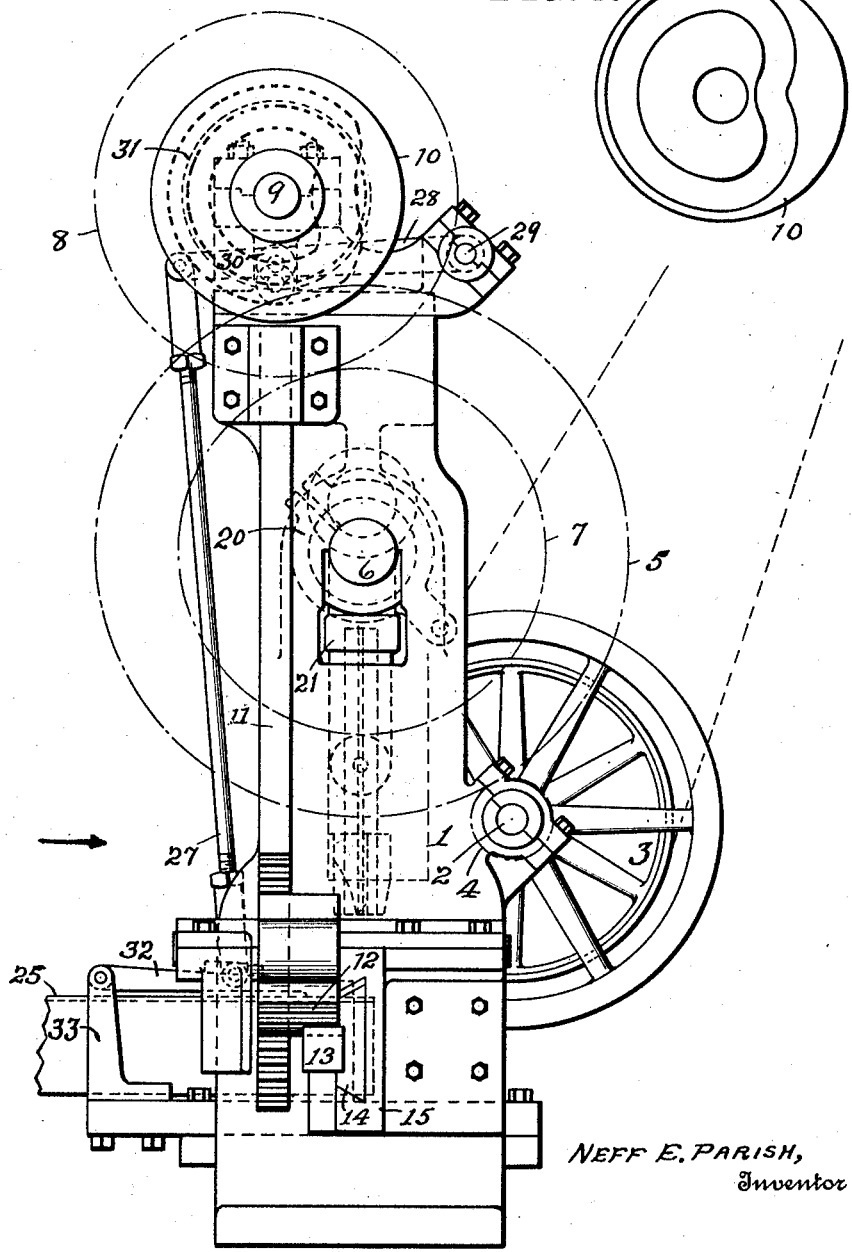

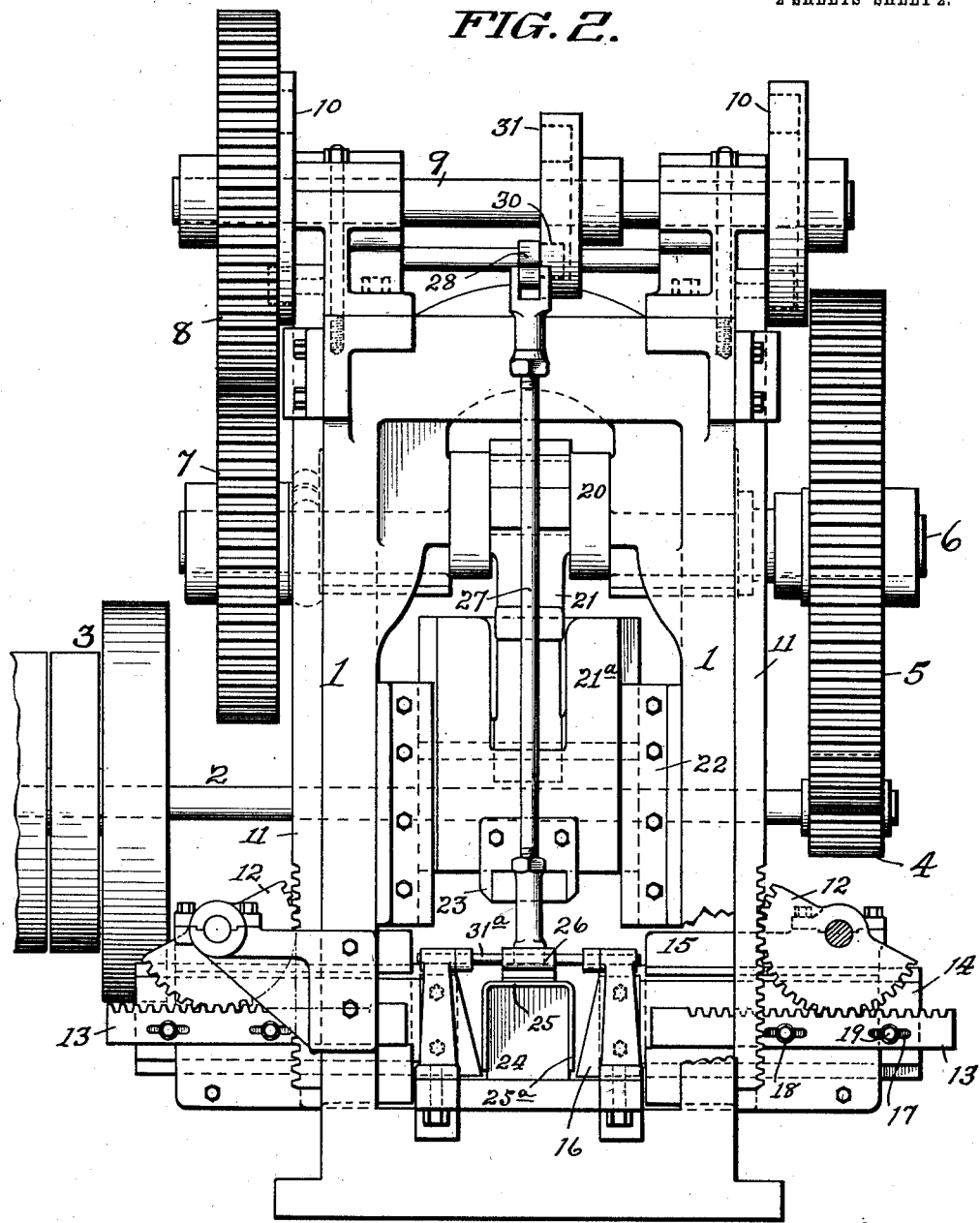

NEFF E. PARISH, OF READING, PENNSYLVANIA, ASSIGNOR TO PARISH MANUFACTURING COMPANY, OF READING, PENNSYLVANIA, A CORPORATION OF NEW JERSEY.

SHEARING-MACHINE.

1,002,746.  Specification of Letters Patent.  Patented Sept. 5, 1911.

Application filed January 19, 1911. Serial No. 603,417.

*To all whom it may concern:*

Be it known that I, NEFF E. PARISH, citizen of the United States, residing at Reading, in the county of Berks and State of Pennsylvania, have invented certain new and useful Improvements in Shearing-Machines, of which the following is a specification.

This invention relates to improvements in shearing machines and the object is to provide a machine for shearing the ends of channel irons or the like.

The invention consists of means for holding the channel iron on a die, shearing the two vertical walls thereof simultaneously and then shearing the horizontal portion, the entire shearing of the three walls being accomplished at one revolution of the machine, and each wall being sheared with a separate blade.

The invention is more fully described in the accompanying specification and clearly illustrated in the drawings forming a part hereof.

Figure 1 is a side elevation of my machine. Fig. 2 is a rear end view, looking in the direction of the arrow in Fig. 1. Fig. 3 is a detail showing the construction of the internal cams.

The numeral 1 designates the frame and 2 the power shaft driven by a belt pulley 3. On the end of this shaft opposite the pulley, I locate a gear wheel 4 which meshes with a gear wheel 5, of considerably larger diameter, on a shaft 6. This shaft 6 is provided at its opposite end with a gear wheel 7 which meshes with a gear wheel 8 on a shaft 9 at the top of the machine. This shaft 9 carries two internal cams 10, one at each end (see Fig. 3) and each of these cams is in engagement with a vertical toothed rack 11 by means of a roller which travels in the way of the cam. These racks each mesh with a toothed segment 12, which in turn mesh, each with a horizontal toothed rack 13. These racks 13 are secured to and move with the shear carrying plates 14 which move in guides 15 and each plate carries at its inner end a shear blade 16. The stroke of these plates 14 is regulated to accommodate different widths of channel irons, by means of elongated slots 17 in the racks 13 and pins 19 on the guides 15 which pass through the slots and are provided with set screws 18. The shaft 6 is provided with an eccentric 20 about its center and to this is secured a vertically movable plunger 21 which carries a cross-head 21ª, moving in guides 22. The cross-head carries a shearing bade 23 at its lower end.

The numeral 24 designates the die and 25 the channel iron to be sheared.

The numeral 26 designates a clamping device for holding the channel iron in position on the die during the operation of shearing. This device comprises a rod 27 pivotally secured at its top to a lever 28 whose opposite end is pivoted at 29 to the frame. This lever is provided with a roller 30 which engages an internal cam 31, of like construction with the cams 10, and located on the shaft 9. The lower end of the rod 27 carries a clamping foot 26 through which a shaft 31ª passes, and to the ends of which bars 32 are secured at their one end, while the opposite ends of the bars are pivoted to uprights 33 on the frame. When the channel iron is placed in position on the die, with the portion to be cut off projecting beyond its face, the machine is started and the turning of the shaft 9, which receives motion through the gears 4, 5, 7 and 8 will, through the cam 31 and the roller 30 which travels in it, press the clamping rod down and cause the foot 26 to hold the channel iron in position on the die. This cam 31 is set slightly in advance of the two cams 10, also located on the shaft 9, so that by the time the clamp is in position, the cams 10 will, through the racks 11, segments 12 and racks 13 cause the slides 14 carrying the shearing blades 16 to travel toward each other, that is, toward the channel iron to be cut. At the same time that the shears 16 begin to move, the eccentric 20 will cause the vertically movable shear 23 to begin its downward movement, but, by reason of the greater distance to be traveled by this vertical shear, the side shears will have cut the vertical walls of the channel iron and started their return movement by the time the shear 23 reaches the surface of the channel iron 25.

It will be noted that at each revolution of the machine, the three shear blades will make a complete movement in both directions. The vertically moving blade will be moving during the entire time of the machine's revolution, while the side shears will operate more rapidly, due to the cam action, and make their movements in about one half the time. The side shears will cut the vertical walls 25ª up to the point of its bend and the vertically moving blade will complete the operation by shearing the top wall 25.

It is evident that dies of different size may be used to accommodate channel irons of greater width or depth, and that the stroke of the side shears may be set to begin shearing early or late in their movement, as required.

Having thus fully described my invention, what I claim and desire to secure by Letters Patent is:—

1. In a shearing machine, a frame, a vertically movable shearing blade, two horizontally movable shearing blades, a clamping device adapted to hold the object to be operated upon, means for operating the clamping device, means for operating the horizontally movable shear blades in unison, means for operating the vertically movable shearing blade, and a die for receiving the object to be sheared.

2. In a shearing machine, a frame, a die for the object to be sheared, a shaft, a vertically movable shearing blade eccentrically connected to said shaft, a pair of horizontally movable shearing blades, means comprising cams, toothed racks and toothed segments for moving said horizontally movable blades in unison, a shaft carrying an internal cam, and a clamping device in engagement with and operated by said cam, said clamp adapted to hold the object to be sheared on the die.

3. In a channel-iron shearing machine, a frame, a power shaft, two secondary shafts, gears for transmitting rotary motion to said secondary shafts, one of the secondary shafts having an eccentric thereon, a plunger secured to the eccentric, a cross-head secured to the plunger, and a shearing blade carried by the cross-head; a pair of internal cams on the other secondary shaft, vertical toothed racks in engagement with said cams, toothed segments engaging said racks, horizontal toothed racks engaging the segments, shear carrying plates secured to said racks, blades on the ends of said plates, a central cam on the last named secondary shaft, a clamping device in engagement with said central cam, and a die for holding the channel iron while being sheared.

In testimony whereof I affix my signature, in presence of two witnesses.

NEFF E. PARISH.

Witnesses:
E. B. WELDER,
ED. A. KELLY.

---

Copies of this patent may be obtained for five cents each, by addressing the "Commissioner of Patents, Washington, D. C."